UNITED STATES PATENT OFFICE.

CONRAD SCHRAUBE, OF LUDWIGSHAFEN-ON-THE-RHINE, GERMANY, ASSIGNOR TO THE BADISCHE ANILIN AND SODA FABRIK, OF SAME PLACE.

RED BASIC DYE.

SPECIFICATION forming part of Letters Patent No. 533,829, dated February 5, 1895.

Application filed October 30, 1894. Serial No. 527,471. (Specimens.) Patented in England May 27, 1892, No. 10,138; in Germany July 2, 1892, No. 77,226, and in France October 5, 1892, No. 222,863.

*To all whom it may concern:*

Be it known that I, CONRAD SCHRAUBE, doctor of philosophy, a subject of the King of Prussia, residing at Ludwigshafen-on-the-Rhine, in the Kingdom of Bavaria and Empire of Germany, have invented new and useful Improvements in the Manufacture of New Red Basic Coloring-Matter, (for which I have obtained patents in Germany, No. 77,226, dated July 2, 1892; in England, No. 10,138, dated May 27, 1892, and in France, No. 222,863, certificat d'addition, dated October 5, 1892,) of which the following is a specification.

I have invented a new red basic coloring-matter which is chemically beta-alkyl-eurhodin. Under the term alkyl I include ethyl and methyl.

My new dye occurs usually as a red powder in the form of its hydrochloric acid salt but it is also desired to protect it in the form of other salts and as base. In the form of hydrochlorate it is soluble in water giving red solutions, and it is not precipitated by ammonia solution, but on the addition of caustic soda the coloring-matter base separates as a bluish red precipitate. This precipitate of the base dissolves in ammonium chloride solution, the hydrochlorate being formed again. The salt is soluble in alcohol the resulting solution possessing an intensely green-yellow fluorescence. It dissolves in concentrated sulfuric acid giving a red solution which on dilution with water turns through green and black to red once more.

My new dye can best be prepared by the interaction of an azo-dye from mono-alkyl-para-toluidin and alpha-napthylamin.

The following example will serve to illustrate the manner in which my invention can best be carried into practical effect. The parts are by weight.

*Example.*—Heat together about ten (10) parts of the azo-dye obtained by combining diazo-sulfanilic acid and mono-alkyl-para-toluidin with about fifty (50) parts of phenol on the water-bath. As soon as the temperature reaches ninety-five degrees centigrade (95° C.) add about nine (9) parts of alpha-naphthylamin hydrochlorate. After a short time the reaction sets in and the temperature rises above one hundred degrees centigrade (100° C.). When it falls again below this point the reaction may be regarded as ended. Stir the melt into cold dilute caustic soda solution to remove the phenol used as a diluent. Collect the crude coloring-matter which separates and wash with water until the wash-water is only slightly alkaline. Next extract with boiling dilute hydrochloric acid (containing about five per cent. (5%) real acid ($HC_1$) and precipitate the dyestuff from the filtered solutions by adding common salt. To purify dissolve the coloring-matter so obtained in fifty (50) times the weight of water, add sufficient ammonia to the cold solution to give a weakly alkaline solution, stir for about one hour and filter. Finally precipitate the coloring-matter from the solution with hydrochloric acid and zinc chlorid, press and dry.

The new coloring-matter dyes bright scarlet shades on cotton mordanted with tannin and on silk.

My new coloring-matter may also be obtained by the condensation of amido-naphthoquinone-imid with mono-alkyl-ortho-toluylene-diamin or the same practical result is obtained with the lower homologue mono-alkyl-ortho-phenylene-diamin; but the method above described in the example yields the best commercial results.

Now, what I claim is—

1. As an article of manufacture the new red coloring matter both as base and salt, which is chemically beta-alkyl-eurhodin and occurs usually in the form of hydrochlorate soluble in water giving a red solution, from which ammonia does not, but caustic soda does precipitate the base which redissolves as hydrochlorate in ammonium chlorid solution and which yields a red solution in concentrated sulfuric acid, which on dilution with water turns through green and black back to red substantially as described.

2. The new process for the manufacture of red coloring matter which process consists in heating together alpha-naphthylamin hydrochlorate and an azo-dye derived from mono-alkyl-para-toluidin, diazo sulfanilic acid and phenol substantially as described.

In testimony whereof I have hereunto set my hand in the presence of two subscribing witnesses.

CONRAD SCHRAUBE.

Witnesses:
ERNEST F. EHRHARDT,
ADOLPH REUTLINGER.